ively represent hydrogen, chlorine or bromine and $R_4$ and $R_5$, taken together, represent the vinylene
United States Patent Office 3,471,485
Patented Oct. 7, 1969

3,471,485
3-BENZHYDRYL-as-TRIAZINES
Donald L. Trepanier, Indianapolis, Ind., assignor to The Dow Chemical Company, Midland, Mich., a corporation of Delaware
No Drawing. Filed Oct. 23, 1967, Ser. No. 677,057
Int. Cl. C07d 55/10; A61k 27/00
U.S. Cl. 260—248
10 Claims

ABSTRACT OF THE DISCLOSURE

Novel 3 - (substituted benzhydryl) - 1,4,5,6-tetrahydro-(substituted)-as-triazines are prepared by the reaction of an alkyl- or hydroxyalkyl-aminoalkylhydrazine with a substituted diphenylacetimidate hydrohalide or a substituted diphenylthioacetiamide hydrohalide, or by the reaction of diphenylacetonitrile with a hydrazino alcohol. The novel compounds are useful as antidepressants as indicated by their antagonism of reserpine.

SUMMARY OF THE INVENTION

This invention relates to novel 3-substituted-as-triazine compounds and is more particularly directed to 3-(substituted benzhydryl) - 1,4,5,6-tetrahydro(substituted)-as-triazines corresponding to the formula:

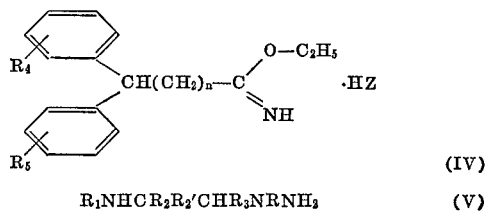

(I)

In the following specification and claims, $m$ and $n$ each independently represent an integer from zero to 1, HX represents hydrobromide or hydrochloride, R, $R_2$, $R_2'$ and $R_3$ each independently represent hydrogen or a lower alkyl group containing 1 or 2 carbon atoms, $R_1$ represents hydrogen or a lower alkyl or lower alkylhydroxy group containing from 1, to 2, to 3 carbon atoms, $R_4$ and $R_5$ each independently represent hydrogen, chlorine or bromine and $R_4$ and $R_5$, taken together, represent the vinylene group of 5H-dibenzo(a,d)cyclohepten-5-yl radical corresponding to Formula II or the ethylene group of a 10,11-dihydro-5H-dibenzo(a,d)cyclohepten-5-yl radical corresponding to Formula III:

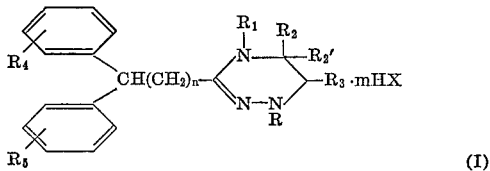

(II)          (III)

For the sake of convenience, the novel compounds corresponding to Formula I will be referred to hereinafter as "benzhydryl triazines."

The novel triazine compounds are crystalline solids which are of varying degrees of solubility in organic solvents such as ether, alcohols, chlorinated hydrocarbons, lower alkanes and esters such as ethyl acetate and which are very slightly soluble in water. The hydrochloride and hydrobromide salts of the novel compounds are crystalline solids which are slightly soluble in benzene and ethers and moderately soluble in water and alcohols.

The benzhydryl triazines of the invention have been found to be useful for administration to laboratory animals in the study of drug effects on the central and peripheral nervous systems. They have been found to be particularly useful as antidepressants as indicated by their antagonism of reserpine-induced depression and their potentiation of d-amphetamine toxicity. The compounds corresponding to Formula I wherein R represents lower alkyl are useful for prolonging the effects of barbiturates.

The novel compounds can be prepared by the reaction of an ethyl substituted imidate hydrohalide corresponding to Formula IV with a β-aminoalkylhydrazine corresponding to Formula V:

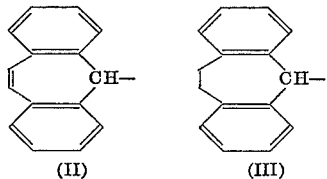

(IV)

$R_1NHCR_2R_2'CHR_3NRNH_2$          (V)

In Formulae IV and V above, $n$, R, $R_1$, $R_2$, $R_2'$, $R_3$, $R_4$ and $R_5$ have the significance set out above with respect to Formula I and HZ represents a hydrohalide such as hydrochloride or hydrobromide. The ethyl substituted imidate hydrohalide starting materials are prepared by the reaction of a substituted nitrile such as 2,2-diphenylacetonitrile,2-(4-chlorophenyl)-2-phenylacetonitrile, 2-(3-bromophenyl)-2-phenylacetonitrile, 5H-dibenzo(a,d)cyclohepten-5-yl nitrile, 4,4'-dichlorobenzhydrylacetonitrile or benzhydrylacetonitrile with ethanol and an excess of a hydrogen halide such as hydrogen bromide or preferably hydrogen chloride. In a convenient procedure, the substituted nitrile is dissolved in ether, and the ethanol and hydrogen halide are mixed with the solution at a temperature of 0°–25° C. The mixture is held for 1–4 days, after which the ethyl substituted imidate hydhohalide starting material is separated by filtration or evaporation. The ethyl substituted imidate hydrohalide can be purified by recrystallization or employed directly to prepare the benzhydryl triazines of the invention.

The reaction proceeds when the ethyl substituted imidate hydrohalide and the β-aminoalkylhydrazine are contacted and mixed and is preferably carried out in an inert organic solvent as a reaction medium. Representative inert organic solvents which can be employed as reaction media include methanol, ethanol and isopropanol. The reaction proceeds at temperatures of 20° to 150° C. and is preferably carried out at the boiling point of the reaction mixture under reflux. The product can be separated from the reaction mixture by acidifying the reaction mixture by the addition of dilute aqueous acid followed by extraction to remove by-products such as substituted acetamides and ethyl substituted acetates. An aqueous base such as aqueous sodium hydroxide is then added to make the mixture strongly basic. The product can then be purified by recrystallization from organic solvents such as ethyl acetate, ether, pentane and the like.

In a convenient procedure, a β-aminoalkylhydrazine corresponding to Formula V is dissolved in ethanol and the solution is added dropwise to a solution of an ethyl substituted imidate hydrochloride in ethanol. The exact proportions of the reactants to be employed are not critical; however, the ethyl substituted imidate hydrohalide and the β-aminoalkylhydrazine are consumed in equimolar proportions and the reactants are preferably employed in such proportions. The reaction mixture is heated at a temperature within the reaction temperature range for a period of time sufficient for the reaction to take place. The reaction is generally complete in about one to 72 hours depending upon the reaction temperature employed. The mixture is then mixed with sufficient aqueous hydrochloric or sulfuric acid to provide a pH of about 2 or 3 in the resulting mixture and the acidic mixture is washed with chloroform or methylene chloride. The mixture is then mixed wtih sufficient aqueous sodium carbonate or sodium hydroxide to provide a pH of about 10 to 12 in the resulting mixture. The product is separated by extraction with chloroform or methylene chloride followed by evaporation of the extract to leave the benzhydryl triazine product as a residue. The product can be purified by recrystallization or it can be converted to the hydrochloride or hydrobromide salt by treatment with ethereal hydrogen chloride or ethereal hydrogen bromide.

In an alternative procedure, the compounds of the invention wherein $R_1$ is hydrogen and $R_2$ and $R_2'$ both represent methyl or ethyl can be prepared by the condensation of a substituted nitrile corresponding to Formula VI with a β-hydrazino alcohol corresponding to Formula VII:

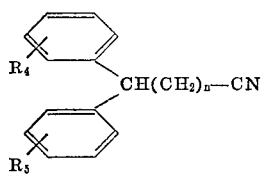

(VI)

$$R_2R_2'C\underset{\underset{OH}{|}}{\phantom{C}}\underset{\underset{R_3}{|}}{CH}\underset{\underset{R}{|}}{N}NH_2$$

(VII)

In Formulae VI and VII above, $n$, R, $R_3$, $R_4$ and $R_5$ have the significance set out above with respect to Formula I and $R_2$ and $R_2'$ each independently represent methyl or ethyl. The reaction between the substituted nitrile and the β-hydrazino alcohol proceeds when the reactants are contacted and mixed in concentrated sulfuric acid. The condensation is carried out at a temperature from 0° to 55° C. and is preferably carried out at about 10° C. The product can be separated by conventional procedures such as washing with chlorinated hydrocarbon solvents such as chloroform or methylene chloride followed by the addition of aqueous base such as aqueous sodium carbonate or aqueous sodium hydroxide and extraction with chlorinated hydrocarbon solvents. The product can be obtained from the extract by evaporation and can be purified by conventional procedures such as recrystallization.

In a convenient procedure, a substituted nitrile corresponding to Formula VI is mixed with concentrated sulfuric acid and the mixture is stirred at a temperature within the reaction temperature range while a β-hydrazino alcohol corresponding to Formula VII is added dropwise to the mixture. The β-hydrazino alcohol can be added as a solution in an inert solvent such as methylene chloride, if desired. The exact proportions of the reactants to be employed are not critical, some of the desired product being obtained when the reactants are combined in any proportions. However, the condensation reaction consumes the reactants in equimolar proportions and the use of the reactants in such proportions is preferred. The mixture is held at a temperature within the reaction temperature range for a period of time sufficient for the reaction to take place, generally from about 5 to 15 minutes. The reaction mixture is then diluted with water and washed with chloroform. The washed mixture is then made strongly basic by the addition of aqueous sodium carbonate or sodium hydroxide solution and the basic mixture is extracted with chloroform. The benzhydryl triazine product can be obtained by evaporation of the extract and purified by recrystallization. The product can be administered to animals or converted to a hydrobromide or hydrochloride salt by treatment with ethereal hydrogen chloride or ethereal hydrogen bromide.

The benzhydryl triazines of the invention can also be prepared by the reaction of a β-aminoalkylhydrazine corresponding to Formula V above with a methyl substituted thioimidate hydrohalide corresponding to the formula:

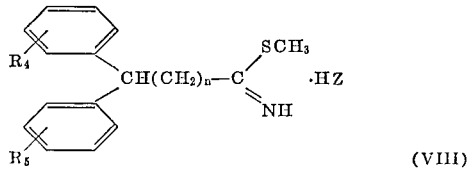

(VIII)

In Formula VIII above, $n$, $R_4$ and $R_5$ have the significance set out above with respect to Formula I and HZ represents a hydrohalide such as hydrochloride, hydrobromide or hydroiodide. This method is especially convenient for the preparation of the compounds corresponding to Formula I wherein $R_4$ and $R_5$ are substituted.

The methyl substituted thioimidate hydrohalide starting materials can be prepared by the reaction of a substituted nitrile such as 10,11-dihydro-5H-dibenzo(a,d) cyclohepten-5-yl nitrile, 2-(4-chlorophenyl)-2-phenylacetonitrile or 2-benzhydrylacetonitrile with excess hydrogen sulfide in the presence of pyridine and triethylamine. In a convenient procedure the substituted nitrile and the hydrogen sulfide are mixed together with a mixture of pyridine and triethylamine, the pyridinetriethylamine mixture serving also as a reaction medium. The reaction proceeds at temperatures of 0°–25° C. and is generally complete in 1–4 days. The substituted thioamide product is then reacted with a methyl halide, preferably methyl iodide, in acetone as a reaction medium. The reaction is conveniently carried out at ambient temperatures and is generally complete in one day. The methyl substituted thioimidate hydrohalide can be separated by filtration or evaporation in vacuo and purified by recrystallization or employed directly in the preparation of the benzhydryl triazines of the invention.

The reaction between the methyl substituted thioimidate hydrohalide and the β-aminoalkylhydrazine proceeds when the reactants are contacted and mixed. The reaction proceeds at temperatures from 20° to 150° C. and is preferably carried out at the boiling point under reflux. The reaction is preferably carried out in an inert organic solvent as a reaction medium. Representative inert organic solvents which can be employed as reaction media include methanol, ethanol and isopropanol. The benzhydryl triazine product can be separated from the reaction mixture by conventional procedures such as evaporation to leave the product as a residue. The product can be purified by conventional procedures such as recrystallization, washing and extraction.

In a convenient procedure, a methyl substituted thioimidate hydroiodide corresponding to Formula VIII, a β-aminoalkylhydrazine corresponding to Formula V and an inert organic solvent are mixed together. The exact proportions of the reactants to be employed are not critical; however, the reaction consumes the reactants in equimolar proportions and the use of the reactants in such proportions is preferred. The mixture is heated at a temperature within the reaction temperature range for a period of time sufficient for the reaction to go to completion, generally from 1 to 72 hours, depending upon the exact reaction temperature employed. The reaction mixture is then evaporated, the residue is dissolved in chloroform and the chloroform solution is washed with aqueous base such as aqueous sodium carbonate or aqueous sodium hydroxide. Alternatively, the reaction mixture can be mixed with aqueous base and the basic mixture extracted with chloroform. In either procedure, the product can be obtained by evaporation of the chloroform solution or the chloroform extract. The benzhydryl triazine product can be purified by conventional procedures such as recrystallization or chromatography, or it can be converted to the hydrochloride or hydrobromide salt by treatment with ethereal hydrogen chloride or hydrogen bromide.

The hydrohalides of the benzhydryl triazines are prepared by dissolving the free base of a benzhydryl triazine in ether and mixing the ether solution with ethereal hydrogen chloride or ethereal hydrogen bromide until precipitation is complete. The reaction proceeds at temperature from 0° to 50° C. and is conveniently carried out at room temperature. The hydrohalide salt can be separated by conventional procedures such as evaporation, filtration or centrifugation and purified by conventional procedures such as recrystallization.

DESCRIPTION OF THE PREFERRED EMBODIMENTS

The following examples illustrate the invention but are not to be construed as limiting the same.

Example 1

1-(2-aminoethyl)hydrazine (15 grams; 0.20 mole) was dissolved in 50 milliliters of ethanol and the resulting solution was added dropwise over a period of ten minutes to a stirred mixture of ethyl diphenylacetimidate hydrochloride (56 grams; 0.20 mole) in 300 milliliters of ethanol. The mixture was stirred at room temperature for one hour and then heated at the boiling point under reflux for four hours. The reaction mixture was concentrated in vacuo, cooled and poured onto crushed ice. Dilute aqueous sulfuric acid was added to the cooled mixture to lower the pH of the resulting mixture to about 2 and the mixture was washed with methylene chloride, the washings being discarded. The acidic, washed mixture was poured onto crushed ice and a mixture of aqueous sodium carbonate and aqueous sodium hydroxide solutions was added to make the mixture strongly basic (pH of about 12). The mixture was then extracted with chloroform and the chloroform extract was dried over anhydrous magnesium sulfate and evaporated in vacuo. The 3-benzhydryl-1,4,5,6-tetrahydro-as-triazine product was obtained as a residue. The product was recrystallized twice from ethyl acetate and found to melt at 159°–160° C. The product was found by analysis to have carbon, hydrogen and nitrogen contents of 76.17, 6.90 and 16.80 percent, respectively, as compared with the theoretical contents of 76.46, 6.82 and 16.72 percent, respectively, calculated for the named structure.

In substantially the same procedure, 3-benzhydryl-1,4,5,6-tetrahydro-1-methyl-as-triazine, melting at 121°–122° C., was prepared by the reaction of ethyl diphenylacetimidate hydrochloride and 1-methyl-1-(2-aminoethyl)hydrazine. The product was recrystallized from ethyl acetate and found to have carbon, hydrogen and nitrogen contents of 76.84, 7.44 and 15.90 percent, respectively, by analysis, as compared with the theoretical contents of 76.95, 7.22 and 15.84 percent, respectively, calculated for the named structure.

In substantially the same procedure, 3-benzhydryl-1,4,5,6 - tetrahydro-1-methyl-4-(2-hydroxyethyl) - as-triazine, melting at 179°–181° C., was prepared by the reaction of ethyl diphenylacetimidate hydrochloride and 1-methyl-1-(2-hydroxyethylamino)hydrazine. The product was recrystallized from ethyl acetate and was found by analysis to have carbon, hydrogen and nitrogen contents of 73.26, 7.64 and 13.43 percent, respectively, as compared with the theoretical contents of 73.75, 7.49 and 13.58 percent, respectively, calculated for the named structure.

In substantially the same procedure, 3-benzhydryl-methyl-1,4,5,6-tetrahydro-as-triazine, melting at 104°–105° C., was prepared by the reaction of ethyl 2-benzhydrylacetimidate hydrochloride and 1-(2-aminoethyl)-hydrazine. The product was found by analysis to have carbon, hydrogen and nitrogen contents of 77.3, 7.5 and 15.9 percent, respectively, as compared with the theoretical contents of 77.0, 7.2 and 15.8 percent, respectively, calculated for the named structure.

Example 2

Diphenylacetonitrile (19.3 grams; 0.1 mole) was added portionwise to 100 milliliters of concentrated sulfuric acid at a temperature of 10° C. over a period of 15 minutes. Thereafter, over a period of 1.5 hours, a mixture of 1-methylhydrazino-t-butyl alcohol (11.9 grams; 0.1 mole) and 10 milliliters of methylene chloride was added dropwise to the cooled, stirred mixture. Fifteen minutes after the addition was completed, the mix-resulting mixture was washed with chloroform, the washings being discarded. The washed mixture was made strongly alkaline (pH 11) by the addition of aqueous sodium carbonate solution and aqueous sodium hydroxide solution. The alkaline solution was then extracted with chloroform and the chloroform extract was washed with water, dried over magnesium sulfate and evaporated in vacuo. The residue was crystallized by rubbing with a glass rod under anhydrous diethyl ether and the 3-benzhydryl-1,5,5-trimethyl-1,4,5,6-tetrahydro-as-triazine product was recrystallized from diethyl ether and found to melt at 138°–139° C. The product was found by analysis to have carbon and hydrogen contents of 77.79 and 7.88 percent, respectively, as compared with the theoretical contents of 77.78 and 7.90 percent, respectively, calculated for the named structure.

Example 3

Methyl diphenylthioacetimidate hydroiodide (3.7 grams; 0.01 mole) was mixed together with 1-methyl-1-(2-aminoisopropyl)hydrazine (1 gram; 0.01 mole) and 15 milliliters of ethanol. The resulting mixture was heated at the boiling point under reflux for 24 hours after which the mixture was concentrated in vacuo. The residue was dissolved in chloroform and the chloroform solution was washed once with aqueous sodium carbonate solution and once with water, the washings being discarded. The washed chloroform solution was dried over anhydrous magnesium sulfate and evaporated in vacuo. The 3-benzhydryl-1,5-dimethyl-1,4,5,6-tetrahydro-as-triazine product was recrystallized from a mixture of ether and n-pentane and found to melt at 89°–91° C. The product was found by analysis to have a hydrogen content of 7.7 percent, as compared with the theoretical content of 7.6 percent, calculated for the named structure.

In substantially the same procedure, 3-(4-chlorobenzhydryl)-1,4,5,6-tetrahydro-as-triazine, melting at 176°–178° C., was prepared by mixing together equimolar proportions of methyl 2-(4-chlorophenyl)-2-phenylthioacetimidate hydroiodide and 1-(2-aminoethyl)hydrazine. The product was recrystallized from a mixture of chloroform and n-pentane and was found by analysis to have a hydrogen content of 5.5 percent, as compared with the theoretical content of 5.6 percent, calculated for the named structure.

In substantially the same procedure, 3(4-chlorobenzhydryl)-1-methyl - 1,4,5,6 - tetrahydro-as-triazine, melting at 140°–141° C., was prepared by mixing together equimolar proportions of methyl 2-(4-chlorophenyl)-2-phenylthioacetimidate hydroiodide and 1-methyl-1-(2-aminoethyl)hydrazine. The product was recrystallized from isopropanol and found by analysis to have hydrogen and nitrogen contents of 6.3 and 13.8 percent, respectively, as compared with the theoretical contents of 6.1 and 14.0 percent, respectively, calculated for the named structure.

In substantially the same procedure, 3-(4-chlorobenzhydryl)-1,5-dimethyl-1,4,5,6 - tetrahydro-as-triazine, melting at 121°–125° C., was prepared by mixing together equimolar proportions of methyl 2-(4-chlorophenyl)-2-phenylthioacetimidate hydroiodide and 1-methyl-1-(2-aminoisopropyl)hydrazine. The product was recrystallized from a mixture of ether and n-pentane and was found by analysis to have carbon, hydrogen and nitrogen contents of 69.03, 6.68 and 13.23 percent, respectively, as compared with the theoretical contents of 68.89, 6.42 and 13.39 percent, respectively, calculated for the named structure.

Example 4

Methyl 10,11-dihydro-5H-dibenzo(a,d)cyclohepten-5-yl thioformimidate (14 grams; 0.035 mole), 1-(2-aminoethyl)-1-methylhydrazine (3.1 grams; 0.036 mole) and 200 milliliters of methanol were mixed together and stirred for 18 hours at room temperature. The reaction mixture was then heated at the boiling point under reflux for four hours, concentrated by evaporation in vacuo and cooled. The cooled mixture was mixed with cold water and the mixture was made strongly basic by the addition of aqueous 10 percent sodium hydroxide. The mixture was extracted with methylene chloride and the extract was dried over anhydrous magnesium sulfate and evaporated. The residue was taken up in chloroform and the resulting mixture was chromatographed on a 26 by 5.5 centimeter column containing silicic acid (Mallinckrodt No. 2847). A mixture of chloroform and methanol was employed as an eluant. After 500 milliliters of eluate had come off the column, a 200 milliliter fraction was collected. This fraction was evaporated in vacuo and the residue was dissolved in ether. An ether solution of hydrogen bromide was added to the resulting solution until precipitation of solid material was complete. The 3 - (10,11 - dihydro - 5H - dibenzo(a,d)cyclohepten - 5-yl)-1,4,5,6-tetrahydro-1-methyl-as-triazine hydrobromide product was recrystallized from a mixture of methanol and ethyl acetate and found to melt at 144°–147° C. The structure of the product was confirmed by nuclear magnetic resonance spectroscopy and by infrared spectroscopy.

The benzhydryl triazines of the invention have central nervous system activity as indicated by their antagonism of reserpine. In representative operations, several separate groups of 10 mice each were administered one of the benzhydryl triazines of the invention by intraperitoneal injection. The test compounds were administered at a different dosage rate to each group of mice administered that particular compound. One hour after the administration of the test compounds, the mice were administered reserpine at a dosage rate of 5 milligrams per kilogram by intraperitoneal injection.

The administration of 5 milligrams per kilogram of reserpine intraperitoneally to mice results in a progression of symptoms beginning with drooping of the eyelids (ptosis) and pilo-erection, culminating in a generalized depression with decreased spontaneous motor activity and decreased responsiveness to auditory and tactile stimuli. Antagonism of reserpine-induced depression is indicated by the absence of the above symptoms and observation of normal spontaneous motor activity and normal responsiveness to auditory or tactile stimuli. The dosage of representative benzhydryl triazines of the invention effective to prevent reserpine-induced depression in 50 percent of the mice (ED 50) was calculated. 3-benzhydryl-1-methyl-1,4,5,6-tetrahydro-as-triazine, 3-benzhydryl-1,4,5,6-tetrahydro-as-triazine, 3-benzhydryl-1,5-dimethyl-1,4,5,6-tetrahydro-as-triazine and 3-(4-chlorobenzhydryl) - 1,5 - dimethyl - 1,4,5,6 - tetrahydro - as-triazine were found to produce antagonism of reserpine-induced depression at ED 50's of 48, 23, 45.5 and 200 milligrams per kilogram, respectively.

In other operations, representative compounds of the invention were found to potentiate the symptoms of hyperexcitement and hyperirritability induced in mice by intraperitoneal administration of 5 milligrams per kilogram of d-amphetamine.

In other separate operations, threefold increases in hexabarbital sleep time were obtained when one of 3-benzhydryl - 4 - (2 - hydroxyethyl) - 1 - methyl - 1,4,5,6-tetrahydro - as - triazine or 3 - (4 - chlorobenzhydryl) - 1-methyl-1,4,5,6-tetrahydro-as-triazine was administered to mice by intraperitoneal injection at a dosage rate of 204 milligrams per kilogram.

What is claimed is:

1. A compound corresponding to the formula

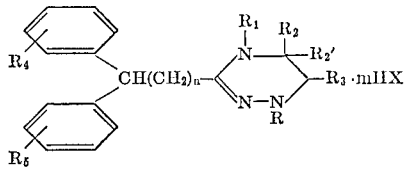

wherein $m$ and $n$ each independently represent an integer from 0 to 1, HX represents a member of the group consisting of hydrobromide and hydrochloride, R, $R_2$, $R_2'$ and $R_3$ each independently represent a member of the group consisting of hydrogen and lower alkyl groups containing from 1 to 2 carbon atoms, inclusive, $R_1$ represents a member of the group consisting of hydrogen and lower alkyl and lower alkylhydroxy groups containing from 1 to 3 carbon atoms, inclusive, $R_4$ and $R_5$ each independently represent a member of the group consisting of hydrogen, bromine and chlorine and $R_4$ and $R_5$, taken together, represent a member of the group consisting of the vinylene group of a 5H-dibenzo(a,d)cyclohepten-5-yl radical and the ethylene group of a 10,11-dihydro-5H-dibenzo(a,d)cyclohepten-5-yl radical.

2. The compound of claim 1 wherein the compound is 3-benzhydryl-1,4,5,6-tetrahydro-as-triazine.

3. The compound of claim 1 wherein the compound is 3-benzhydryl-1-methyl-1,4,5,6-tetrahydro-as-triazine.

4. The compound of claim 1 wherein the compound is 3-benzhydryl - 1,5 - dimethyl - 1,4,5,6 - tetrahydro-as-triazine.

5. The compound of claim 1 wherein the compound is 2 - (4 - chlorobenzhydryl) - 1,5 - dimethyl - 1,4,5,6-tetrahydro-as-triazine.

6. The compound of claim 1 wherein the compound is 3-(4-chlorobenzhydryl)-1-methyl-1,4,5,6-tetrahydro-as-triazine.

7. The compound of claim 1 wherein the compound is 3-(4-chlorobenzhydryl)-1,4,5,6-tetrahydro-as-triazine.

8. The compound of claim 1 wherein the compound is 3 - benzhydryl - 1,5,5 - trimethyl - 1,4,5,6 - tetrahydro-as-triazine.

9. The compound of claim 1 wherein the compound is 3 - benzhydryl - 4 - (2 - hydroxyethyl) - 1 - methyl-1,4,5,6-tetrahydro-as-triazine.

10. The compound of claim 1 wherein the compound is 3-(10,11-dihydro-5H-dibenzo(a,d)cyclohepten-5-yl)-1,4,5,6-tetrahydro-1-methyl-as-triazine hydrobromide.

References Cited

Trepanier et al., J. Medicinal Chem., vol. 9, pp. 881–5 (1966).

Hahn et al., Roczniki Chem., vol. 38, pp. 557–69 (1964), abstract available: Chemical Abstracts, vol. 61, cols. 10685–6 (1964).

HENRY R. JILES, Primary Examiner

J. M. FORD, Assistant Examiner

U.S. Cl. X.R.
260—453, 465, 999